Oct. 1, 1968 W. L. BLACK 3,403,650
RELEASE MECHANISM
Filed Jan. 13, 1967 3 Sheets-Sheet 2
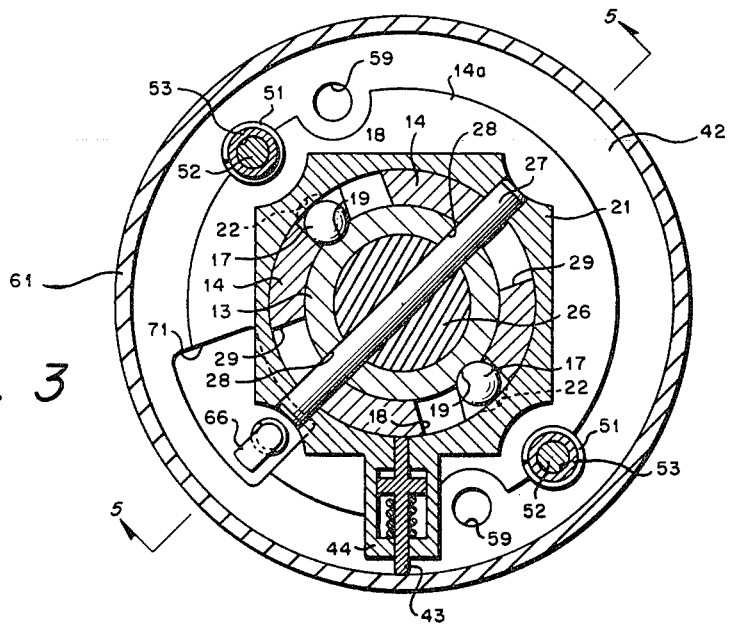
Fig. 3
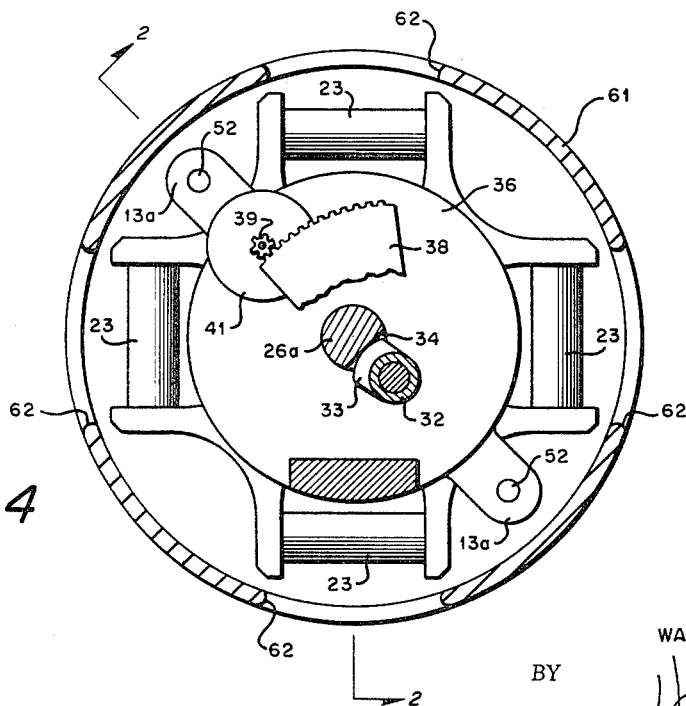
Fig. 4
INVENTOR.
WALTER L. BLACK
BY
ATTORNEY

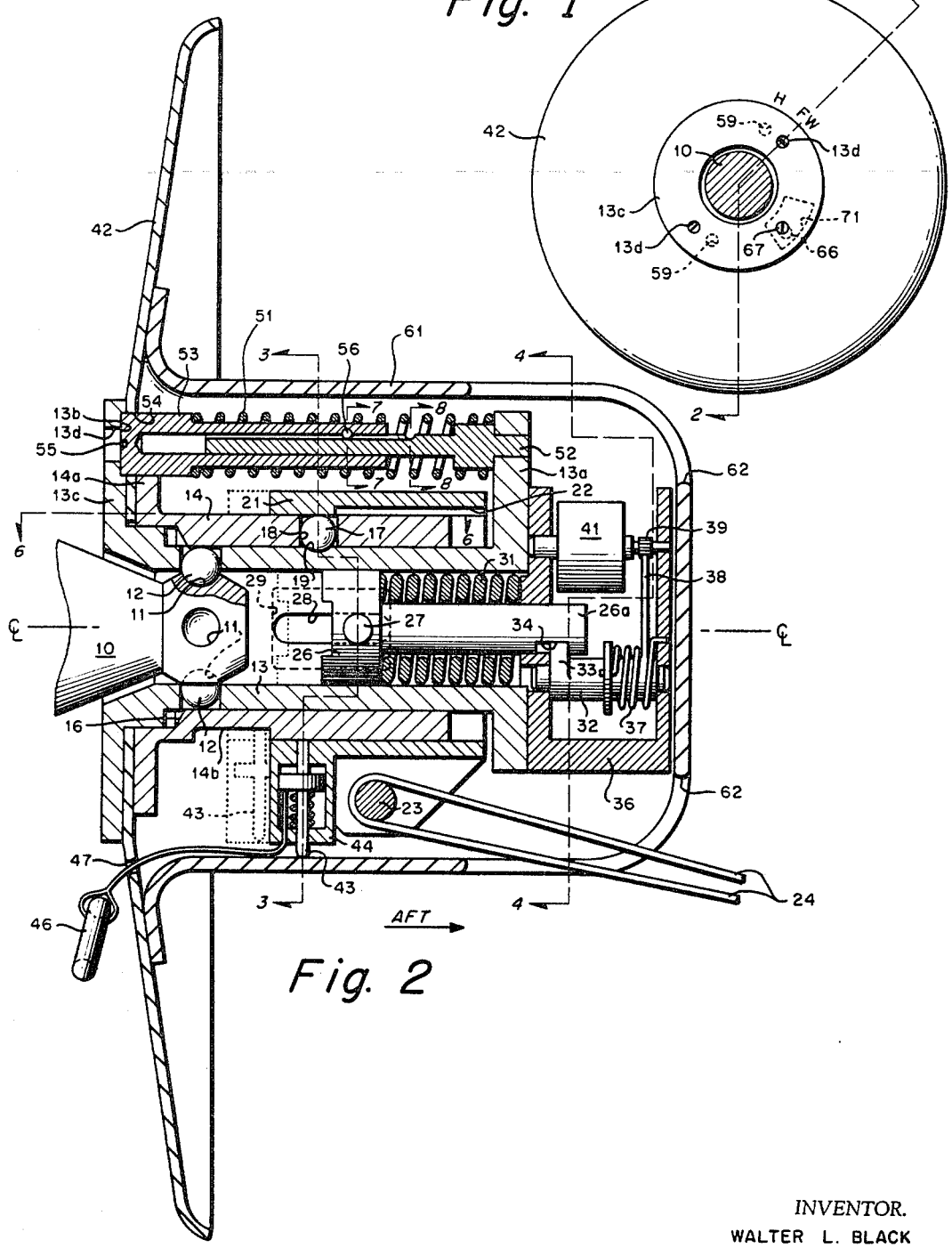

INVENTOR.
WALTER L. BLACK

ATTORNEY

United States Patent Office 3,403,650
Patented Oct. 1, 1968

3,403,650
RELEASE MECHANISM
Walter L. Black, Upper Falls, Md., assignor, by mesne assignments, to the United States of America as represented by the Secretary of the Navy
Filed Jan. 13, 1967, Ser. No. 609,724
10 Claims. (Cl. 114—20)

ABSTRACT OF THE DISCLOSURE

A mechanism for releasing an air-launched torpedo from its parachute upon water entry. After air-launching, a sustained minimum parachute load followed by relief releases a secondary ball detent device thereby unlocking the release mechanism. A subsequent force such as occurs upon water entry or by parachute drag in the water releases a primary ball detent device permitting complete disengagement from the torpedo. The minimum parachute load to be sustained before the mechanism will unlock is selectable for either fixed or rotary wing aircraft launching.

---

One common technique for the aerial delivery of a torpedo utilizes a parachute for retardation. A release mechanism connected between the torpedo and the parachute is enabled upon air launching and causes the parachute to separate from the torpedo upon water entry. Such a release mechanism was primarily designed for use on fixed-wing aircraft making aerial deliveries at speeds ranging from 100 to 500 knots and at altitudes from 100 to 1,000 feet. Occasionally, such a release mechanism would fail to separate from the torpedo due to erratic and unpredictable forces acting on the torpedo-parachute combination after launching. In addition, the operating conditions imposed by fixed wing aircraft launching dictated design parameters which precluded aerial deliveries from rotary wing aircraft or rockets. For example, as contrasted to the high speeds and altitude of fixed wing aircraft, the operating conditions for aerial delivery from a helicopter will range from hover to 150 knots at altitudes of 50 feet and above. Additionally, aerial deliveries from a rocket such as in the ASROC (antisubmarine rocket) system, dictates a considerable reduction in size of the release mechanism.

It is the general purpose of the present invention to improve the separation reliability of the prior art release mechanisms while extending its operational capabilities to readily permit aerial delivery thereof from both rotary wing aircraft and rockets in addition to fixed wing aircraft. Increased reliability is accomplished by providing a secondary ball detent device in the release mechanism which is unlocked by a minimum parachute load after an integrated duration. A primary ball detent device is provided which will release the torpedo upon water entry due to impact force or the force from the shroud lines as the parachute is dragged in the water. Adaptability to fixed wing and rotary wing aircraft is made possible through a manual selection of one of two minimum parachute loads necessary to unlock the mechanism before water entry. The mechanism length has also been reduced according to the invention to a value sufficient to make the unit acceptable for the limited space available in rockets used for aerial delivery of torpedoes.

Accordingly, it is an object of the present invention to provide a parachute release mechanism for aerial delivered torpedoes having improved reliability of release at water entry.

Another object of the invention is to provide a parachute release mechanism for aerial delivery of torpedoes having an extended operational range suitable for deliveries from fixed or rotary wing aircraft.

Still another object of the invention is to provide a parachute release mechanism sufficiently reduced in size as to fit into the space available in existing rockets used to aerially deliver torpedoes.

Various other objects and advantages will appear from the following description of one embodiment of the invention, and the most novel features will be particularly pointed out hereinafter in connection with the appended claims.

In the drawing:

FIG. 1 represents an aft view of a parachute release mechanism constructed according to the invention;

FIG. 2 represents a longitudinal and enlarged view of the release mechanism taken in cross section along the line 2—2 in FIG. 1;

FIG. 3 represents a transverse view of the release mechanism taken in cross section along the line 3—3 of FIG. 2;

FIG. 4 represents another transverse view of the release mechanism taken in cross section along the line 4—4 of FIG. 2;

Figure 5:
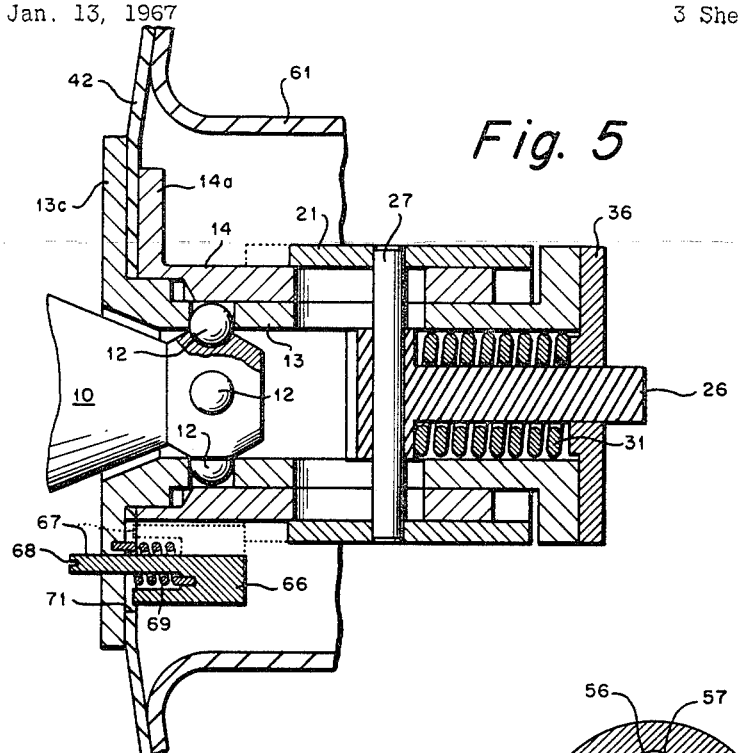
FIG. 5 represents another longitudinal view of the release mechanism taken in cross section along the line 5—5 of FIG. 3.
Figure 7:
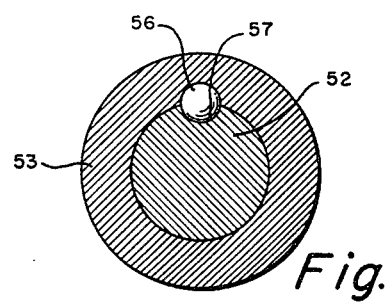
FIG. 7 represents a transverse view of a portion of the release mechanism taken along the line 7—7 of FIG. 2.

Referring now to the illustrated embodiment of the release mechanism according to the invention, there is shown a torpedo nut 10 which is fixed to and extends from the rear of a torpedo, not shown. The nut 10 can be generally described as a bulb-shaped terminal with five equally spaced spherical recesses 11 (only three shown) located in a transverse plane at the point of maximum diameter of the nut. The release mechanism attached to the nut 10 has two selectable operating modes: FW (fixed wing) and H (helicopter). The release mechanism as illustrated is in the FW mode, attached to the torpedo nut 10, ready for launching. Attachment is by five detent balls 12 (only three shown) retained in the forward end of a cylindrical body 13 so that they register with respective recesses 11 when the nut 10 is inserted in the body 13. The balls 12 are urged into the recesses 11 by a primary release cylinder 14 slidably mounted on the body 13. When the primary release cylinder 14 is in the forward position shown in FIG. 2, the balls 12 are restrained from moving out of the recesses 11; and when in the aft position, a flared recess 16 in the cylinder 14 permits the balls 12 to move radially outward from the recesses 11 thereby completely disengaging the torpedo nut 10 from the release mechanism.

Figure 6:
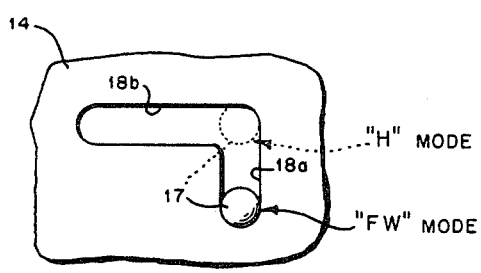
FIG. 6 represents a side view of a portion of the release mechanism taken along the line 6—6 of FIG. 2.

The primary release cylinder 14 is locked in the forward position by two additional detent balls 17 retained in respective L-shaped openings 18. As best seen in FIG. 6, the FW mode restricts the ball 17 to the outer end of a transverse portion 18a of the opening 18 where the ball 17 registers with a spherical recess 19 in the body 13. As will be described hereinbelow, when the release mechanism is in the H (helicopter) mode, the ball 17 will be at the aft end of a longitudinal portion 18b of the opening 18. In the locked position shown, the balls 17 are urged into the recesses 19 by a secondary release cylinder 21 which is slidably mounted around the primary release cylinder 14. The cylinder 21 includes two longitudinal grooves 22 along the aft portion thereof which register with the balls 17 when the cylinder 21 slides forward to an unlock position as shown in dotted outline in FIG. 2. In this position, the balls 17 are free to move radially outward from the recesses 19 thereby permitting the primary release cylinder 14 to move aftward relative to the body 13. At this point it should be noted that in the H mode the balls 17 are in the longitudinal portion 18b of the opening 18, and any forward motion of the secondary release cylinder 21 will not release the balls 17 from the body 13.

Four connecting lugs 23 integrally formed with and radially displaced from the cylinder 21 provide connections for attaching shrouds 24 of a parachute, not shown. A main plunger 26 slidable within and along the length of the body 13 is integrally connected to the secondary release cylinder 21 by a transverse pin 27 which passes through the plunger 26 and engages at each extended end opposite sides of the cylinder 21. Thus, the cylinder 21 and plunger 26 move as one unit. Elongated openings 28 in the body 13 pass the extend pin 27 through and permit the plunger 26 to move forward to the position shown in dotted outline in FIG. 2. Similarly, rectangular openings 29 on opposite sides of the primary release cylinder 14 pass the extended ends of the pin 27 through and permit the plunger 26 to move forward relative to the cylinder 14 and also permit the cylinder 14 to rotate about its cylindrical axis relative to the cylinder 13 and plunger 26 until balls 17 register with the longitudinal portion 18b of the openings 18.

The plunger 26 is locked in the aft position shown against the force of a compression spring 31 by a time-released latch 32 which has a dog 33 abutted against the aft surface of a slot 34 in an aftwardly extending portion 26a of the plunger 26. The latch 32 is rotatably supported on a yoke 36 which in turn is rigidly fixed to a rearward flanged portion 13a of the cylinder 13. The axis of rotation of the release 32 is parallel to the plunger 26 axis but offset sufficiently to enable the dog 33 to rotate completely out of the slot 34. A helical spring 37 around the latch 32 is connected in torsion between the latch 32 and the yoke 36 when the dog 33 is positioned in the slot 34. In the locked position of FIG. 2, the forward force of the spring 31 on the plunger 26 imparts a frictional force on the dog 33 which greatly exceeds the torsional force imparted by the spring 37. Hence, the latch 32 cannot rotate out of the slot 34. The latch 32 also includes a laterally extending gear sector 38 which is drivingly connected to a pinion 39 mounted on the shaft of a flywheel 31 for rotation therewith. The flywheel is rotatably mounted in the yoke 36 on an axis parallel to but spaced from the plunger 26 axis. The sector 38 is positioned relative to the pinion 39 to maintain driving connection with the pinion 29 over the angle subtended during rotation of the dog 33 to clear the slot 34. The purpose of the flywheel 41 is to increase the rotational time of the release 32 due to the added inertia.

When the plunger 26 is in the forward position shown in dotted outline, the primary release cylinder 14 can move aftward relative to the body 13 due to any aftward forces. It is contemplated that this force will be normally imparted upon water entry on a face plate 42 which is fixed to a flanged portion 14a at the forward end of the primary release cylinder 14. In the event that insufficient force is developed at the face plate 42, subsequent drag of the parachute as the torpedo moves through the water will cause the cylinder 14 to move aftward. This is accomplished by a spring-loaded detent plunger 43 slidably mounted in a cylinder 44 which is fixed to the forward end of the secondary release cylinder 21. The plunger 43 is urged radially inward against the cylinder 14. A longitudinal groove 14b in the cylinder 14 registers with and receives the detent plunger 43 when the cylinder 21 has moved forward to the position indicated in dotted outline. In the latter position, aftward motion of the cylinder 21 due to parachute drag in the water will also force the primary release cylinder 14 aftward. A lanyard 46 connected to the plunger 43 and passing through the face plate 42 enables withdrawal of the plunger 43 from the groove 14b and reset of the cylinder 21 to the aft position.

The release mechanism is locked in the FW (fixed wing) mode by a pair of diametrically opposite plunger sleeves 53 which are urged through openings 54 of face plate 42 into recesses 13b of a forward flanged portion 13c of the body 13 by a pair of springs 51. As will be apparent from the disclosure herein set forth, the springs 51 also determine the minimum parachute load required to unlock the mechanism when operating in the H (helicopter) mode. The sleeves 53 are slidably mounted on the extended ends of elongated spring guides 52, the other ends being fixed to the aftward flanged portion 13a of the body 13. Springs 51 are mounted in compression between the sleeves 53 and the flanged portion 13a. The opening 54 is just large enough to receive the sleeve 53 but to prevent relative rotation of the face plate 42 and the body flange portion 13c. An opening 13d in the body flanged portion 13c provides access with a screwdriver to a groove 55 on the forward face of the sleeve 53.

Figure 8:
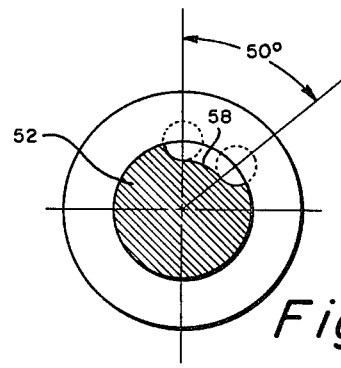
FIG. 8 represents a transverse view of a portion of the release mechanism taken along the line 8—8 of FIG. 2.

To unlock the release mechanism from the FW mode, the sleeves 53 must be moved aftward against the force of springs 51 by a tool pushed through opening 13d. A ball key 56 fixed to the inner wall of each sleeve 53 slides along the length of the spring guide 52 in a longitudinal key slot 57. When the key 56 reaches the aft extremity, the sleeve 53 can be rotated clockwise 50 degrees in transverse slot 58 shown in FIGURE 8 thereby preventing the sleeve 53 from returning to the forward position after removing the pushing force. With both sleeves 53 held in the aft position by keys 56, the face plate 42 and primary release cylinder 14 can be rotated clockwise 25 degrees relative to the body flanged portion 13c to the H mode position. In this position, additional openings 59 in the face plate 42 enable access to the faces of sleeves 53 to rotate the latter back to where the keys 56 again register with slots 57. The openings 59 are smaller than the sleeves 53 so that removal of the pushing force causes the sleeves 53 to be urged against the face plate 42. The entire release mechanism aft of the face plate 42 is contained in an enclosure 61 secured to the plate 42 and has openings 62 for allowing the parachute shroud lines 24 to pass through.

Having thus described the release mechanism for the FW mode, operation in this mode will now be summarized. To install the release mechanism on the torpedo nut 10, a screwdriver is inserted through the holes 13d of body flanged portion 13c forcing the sleeves 53 aft and locking them in this position with a 50-degree clockwise twist of the screwdriver. The face plate 42 is then rotated clockwise 25 degrees to the H mode position where it is now free to be moved aft and uncover the five detent balls 12 which secure the mechanism to the nut 10. The release mechanism is then placed on the torpedo nut 10 with balls 12 aligned with recesses 11; and the face plate 42 and cylinder 14 is moved forward to secure the mechanism to the torpedo. The face plate 42 is rotated back to the FW setting, and the spring-loaded sleeves 53 released with the screwdriver. The mechanism is now ready for fixed wing aircraft operation. Upon launching the torpedo from a fixed wing aircraft, the parachute is deployed and the tension in the shroud lines 24 imparts an afterward load on the secondary release cylinder 21 which is opposed by the compression force of spring 31. When the parachute-imparted force exceeds the spring force, the plunger 26 moves aftward to disestablish its frictional connection to the time-release latch 32. The latch commences to rotate out of the groove 34 at a rate determined by the torsional force of spring 37 and the inertia of flywheel 41. In practice, a spring force of 400 lbs., corresponding to about 75 knots, and a total latch release time of 0.33 second were found to be satisfactory for fixed wing aircraft making aerial deliveries at speeds between 100 and 500 knots. When dog 33 is completely out of the slot 34, the plunger 26 is free to move forward under the driving force of spring 31 when the parachute load is relaxed. This action usually occurs at water entry due to the rapid deceleration of the torpedo. Forward movement of the secondary release cylinder 21 permits balls 17 to move into grooves 22 thereby unlocking the primary release cylinder 14 from the body 13 so that it is free to move aft. Normally, the water pressure on face plate 42 moves the cylinder 14 aft thereby unlocking the five balls 12 so that the torpedo falls free of the release mechanism.

When the secondary release cylinder 21 has advanced to the position shown in dotted outline in FIG. 2, detent plunger 43 is forced into groove 14b. Thus, if release at water entry is not accomplished in the normal manner, loads will build up in the shroud lines 24 as the parachute is dragged in the water. This action will recompress spring 31 and pull the cylinder 21 aft, but the primary release cylinder 14 being attached to the cylinder by the plunger 43 will be forced aft also and cause the torpedo to separate from the mechanism.

When the release mechanism is to be used in aerial deliveries from a low speed helicopter, two operational arrangements in the H mode are possible. In one arrangement, the face plate 42 is rotated to the H mode position in the manner described hereinabove, the mechanism is installed on the torpedo nut 10, and the plunger sleeves 53 are released. In this condition, the plunger 26 is still retained in the aft position by the latch 32 and an airspeed of 75 knots or more is required to sustain the 400 lb. parachute load necessary to unlatch the dog 34. Thus, if an aerial delivery is made at 75 knots or more, the latch 32 will release and the secondary release cylinder 21 will be free to move forward and latch to the primary release cylinder 14 by detent plunger 43 in the manner described hereinabove. However, if a 75-knot speed is not obtained, a water force on the face plate 42 or parachute drag of 75 lbs. or more will compress the springs 51 and move the primary release cylinder 14 aftward thereby separating the torpedo.

The alternative operational arrangement of the H mode provides for aerial deliveries made at speeds less than 75 knots. For this operation, a keeper 66 is provided for limiting the forward position of the cylinder 21. As best seen in FIG. 5, the keeper 66 includes an off center shaft 67 extending forwardly through the body flanged portion 13c and terminating on its face with a groove 68 for receiving a screwdriver. The shaft 67 is rotatably mounted in the portion 13c such that the keeper 66 can rotate from its normal distal position relative to the cylinder 21 to a proximal position as shown in dotted outline in FIG. 5. A helical spring 69 about the shaft portion 67 and connected in torsion between the flanged portion 13c and keeper 66 urges the keeper 66 to the normal distal position. An opening 71 in the face plate 42 allows rotation of the face plate 42 relative to the body 13 between the H and FW modes irrespective of the rotational position of the keeper 66.

This alternative arrangement operates as follows. A cocking tool, not shown, is installed where the torpedo nut 10 normally attaches. A screw in the cocking tool is turned in to force the plunger 26 aftward until it releases the latch 32. The cocking tool screw is then backed off and plunger 26 and cylinder 21 move forward until the cylinder 21 bears against the keeper 66 which has been rotated 180 degrees and held by a screwdriver in the dotted outline position of FIG. 5. The screwdriver and cocking tool may then be withdrawn. For a spring 31 designed for 400 lb. compression (75 knot operation) in the aft position, the compression force now required from the parachute load is about 104 lbs. Parachute loads in excess of this value will normally occur when dropping a torpedo from a hover condition at or above 75 ft. altitudes.

When the torpedo is launched from the helicopter and the parachute load exceeds the compression force, e.g., 104 lbs., the cylinder 21 moves aftward relieving the pressure on the spring-loaded keeper 66 to permit the latter to rotate to its normal distal position. Upon water entry and the parachute load is relaxed, the cylinder 21 is driven forward by the force of the spring 31 sufficiently to permit detent plunger 43 to enter the groove 14b and engage the primary release cylinder 14. Thus, if the force of the water on the face plate 42 does not accomplish its normal function of detaching the release mechanism from the torpedo, the tow of the parachute shroud lines will force the release in the manner described hereinabove.

It will be observed that, in addition to achieving a more reliable and versatile release mechanism, the overall configuration is relatively compact thus permitting its use in the aerial delivery of torpedoes from rockets where space limitations are extremely critical. In an actual embodiment, the invention enabled a reduction in length of the release mechanism to 4.44 inches and made its use in ASROC equipment possible.

It will be understood, of course, that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A parachute release mechanism for an air-launched torpedo comprising:
   a body formed to receive a nut protruding from the aft end of the torpedo;
   primary release means operatively connected to said body and movable between a forward position securing the torpedo nut in the body and an aft position releasing the torpedo nut;
   secondary release means operatively connected to said body and said primary release means movable between an aft position securing said primary release means in its forward position and a forward position enabling said primary release means to move to its aft position, said secondary release means formed to be secured to the shroud lines of a parachute;
   first force-exerting means operatively connected between said body and said secondary release means urging the latter toward its forward position; and
   first latch means operatively connected between said body and said secondary release means for engaging the latter in its aft position, said first latch means including means for disengaging said secondary release means from its aft position upon impartment of a sustained predetermined force on said secondary release means by the parachute in excess of and opposite to the force imparted by said first force-exerting means.

2. A parachute release mechanism as recited in claim 1 further comprising:
   second latch means slidably mounted on said secondary release means and operatively engaging said primary release means when said secondary release means is in the forward position.

3. A release mechanism as recited in claim 2 further comprising:
   slot means formed in said primary release means permitting limited axial rotation and longitudinal movement thereof relative to said body;
   guide means slidably mounted on said body for longitudinal movement relative thereto; and
   second force-exerting means operatively connected between said body and said guide means urging the latter forwardly against a flanged portion of said body when said primary release means is in a first rotatable position, and for urging said guide means against a flanged portion of said primary release means when in a second rotatable position.

4. A parachute release mechanism as recited in claim 3 further comprising:

boss means rotatably mounted in said body flanged portion for movement from a nonengaging to an engaging position limiting the forward movement of said secondary release means; and third force-exerting means operatively connected between said body flange portion and said boss means for urging the latter into the nonengaging position.

5. A parachute release mechanism as recited in claim 1 wherein said primary release means further comprises:

first detent means contained in said body registering with respective recesses in the torpedo nut when received in said body; and first sliding means coaxially mounted about said body for axial rotation and longitudinal motion relative thereto, said first sliding means in a forward position urging said first detent means radially inward into the recesses of the torpedo nut and in an aft position releasing said first detent means.

6. A parachute release mechanism as recited in claim 5 wherein said secondary release means further comprises:

second detent means contained in said first sliding means for registering with respective recesses in said body; and second sliding means coaxially mounted about said first sliding means for axial rotation and longitudinal motion relative thereto and formed to be connected to parachute shroud lines, said second sliding means in an aft position urging said second detent means into said body recesses and in a forward position releasing said second detent means when said body is in the first rotatable position.

7. A parachute release mechanism for an air-launched torpedo comprising:

a cylindrical body formed to receive a nut protruding from the aft end of the torpedo;

first detent means contained in said body registering with respective recesses in the torpedo nut when received in said body;

primary release means coaxially mounted about said body for axial rotation and longitudinal motion relative thereto, said primary release means in a forward position urging said first detent means radially inward into the recesses of the nut and in an aft position releasing said first detent means;

second detent means contained in said primary release means for registering with respective recesses in said body;

secondary release means coaxially mounted about said primary release means for axial rotation and longitudinal motion relative thereto and formed to be connected to parachute shroud lines, said secondary release means in an aft position urging said second detent means into said body recesses and in a forward position releasing said second detent means when said body is in a first rotatable position;

a plunger coaxially supported in said body and drivingly connected to said secondary release means for motion therewith relative to said body;

first force-exerting means urging said plunger and secondary release means toward said forward position;

first latch means rotatably mounted on said body and operatively engaging said plunger in said aft position against the force of said first force-exerting means, said first latch means having a relatively high inertia; and second force-exerting means operatively connected between said latch means and said body for urging said latch out of engagement with said plunger.

8. A release mechanism as recited in claim 7 further comprising:

a second latch means slidably mounted on said secondary release means and operatively engaging said primary release means when said secondary release means is in the forward position.

9. A release mechanism as recited in claim 8 further comprising:

slot means formed in said primary release means permitting limited axial rotation and longitudinal movement thereof relative to said body;

guide means slidably mounted on said body for longitudinal movement thereto;

second force-exerting means operatively connected between said body and said guide means urging the latter forwardly against a flanged portion of said body when said primary release means is in the first rotatable position, and for urging said guide means against a flanged portion of said primary release means when in a second rotatable position.

10. A release mechanism as recited in claim 9 further comprising:

boss means rotatably mounted in said body flange portion for movement from a nonengaging to an engaging position limiting the forward movement of said secondary release means; and third force-exerting means operatively connected between said body flange portion and said boss means for urging the latter into the nonengaging position.

References Cited

UNITED STATES PATENTS

| | | | |
|---|---|---|---|
| 2,723,876 | 11/1955 | Langlois et al. | 102—4 X |
| 3,066,632 | 12/1962 | Bemis. | |
| 3,152,395 | 10/1964 | Karp. | |

SAMUEL W. ENGLE, *Primary Examiner.*